United States Patent [19]

Inoue et al.

[11] Patent Number: 4,596,169

[45] Date of Patent: Jun. 24, 1986

[54] SPINDLE DEVICE

[75] Inventors: Mamoru Inoue; Shoji Hara; Morimichi Hasegawa, all of Hirakata; Kiyokazu Imanishi, Higashi Osaka, all of Japan

[73] Assignee: Matsushita Electric Industrial Co., Ltd., Kadoma, Japan

[21] Appl. No.: 476,963

[22] PCT Filed: Jul. 14, 1982

[86] PCT No.: PCT/JP82/00266

§ 371 Date: Jul. 5, 1983

§ 102(e) Date: Jul. 5, 1983

[30] Foreign Application Priority Data

Jul. 15, 1981 [JP] Japan .............................. 56-111477

[51] Int. Cl.$^4$ ............................................. B23B 19/02
[52] U.S. Cl. ..................................................... 82/30
[58] Field of Search ................... 82/30, 28 R; 384/111

[56] References Cited

U.S. PATENT DOCUMENTS

| 2,278,264 | 3/1942 | Hollengreen et al. | 82/30 |
| 2,419,622 | 4/1947 | Anderson | 82/30 |
| 3,223,463 | 12/1965 | Porath | 384/111 |
| 3,681,879 | 8/1972 | Kobayashi | 82/30 |
| 3,735,652 | 5/1973 | Scharfen | 82/30 |

FOREIGN PATENT DOCUMENTS 1305034 8/1962 France ..................................... 82/30

Primary Examiner—Leonidas Vlachos
Attorney, Agent, or Firm—Wenderoth, Lind & Ponack

[57] ABSTRACT

A spindle device has a housing, a hydrostatic fluid bearing in the housing, a spindle rotatably supported in the hydrostatic fluid bearing, a bracket securely mounted on the housing, a roller bearing on the outer circumference of the bracket concentric with the spindle, a pulley mounted on the roller bearing, and a connector connecting the pulley with the spindle for transmitting rotation of the pulley to the spindle.

3 Claims, 8 Drawing Figures

SPINDLE DEVICE

TECHNICAL FIELD

The present invention relates to a spindle device used in the lathe, etc., and provides a spindle device whereby highly accurate rotation can be obtained without causing much spindle swing.

BACKGROUND ART

Recently, the demand for precision machined parts is increasing and lathes using various spindle devices have been put in practical use to meet the demand. A cam type lathe using such a conventional spindle device will now be described with reference to FIG. 1.

A workpiece 1 is rotated by a chuck 4 attached to the spindle 3 of a headstock 2. The torque is transmitted to the spindle by a belt 5, but the situation is that a variation in the tension of the belt 5 causes deformation of the spindle 2, making it impossible to attain accurate rotation of the workpiece 1. In an effort to avoid this difficulty, a magnetic coupling has been employed where accuracy is required, but there has been a problem that such a device is too complicated to be practical.

DISCLOSURE OF INVENTION

The invention relates to a spindle device used in a lathe, etc., wherein a hydrostatic fluid bearing is formed between the spindle and a housing rotatably supporting the spindle to make it possible to attain highly accurate rotation without causing much spindle swing, and a rotatable pulley is installed through a bearing on the outer periphery of a bracket fixed to the housing, said pulley and spindle being connected together only in the direction of rotation, thereby remedying the drawback that accurate rotation cannot be effected, which has heretofore been a problem, so as to make it possible to obtain highly accurate rotation.

BEST MODE OF CARRYING OUT THE INVENTION

Figure 1:
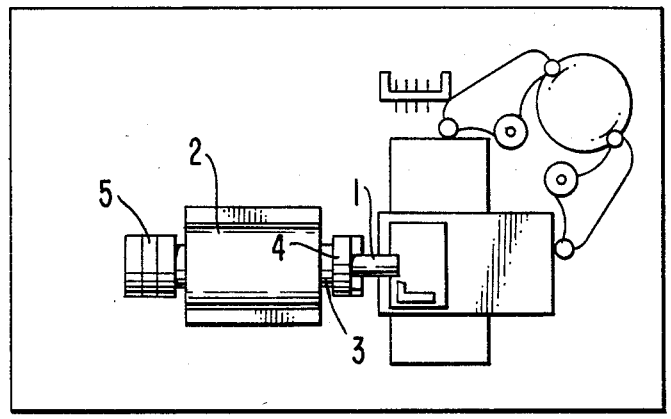
FIG. 1 is a schematic plan view of a cam type lathe using a conventional spindle device.
Figure 2:
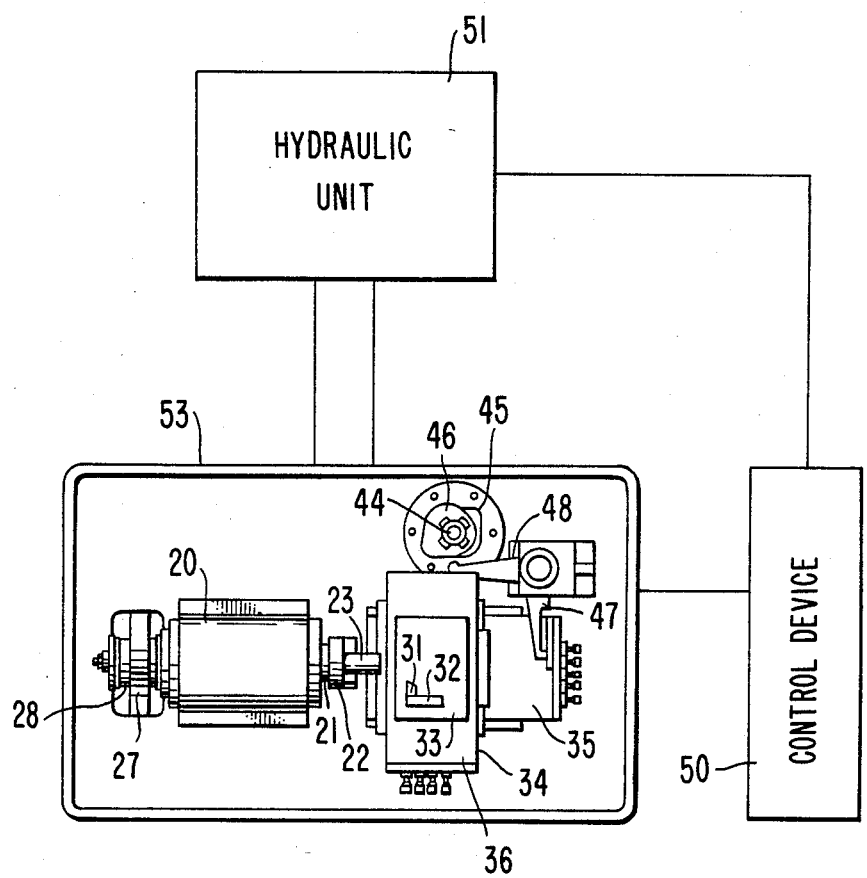
FIG. 2 is a plan view of a lathe using a spindle device according to an embodiment of the present invention.
Figure 3:
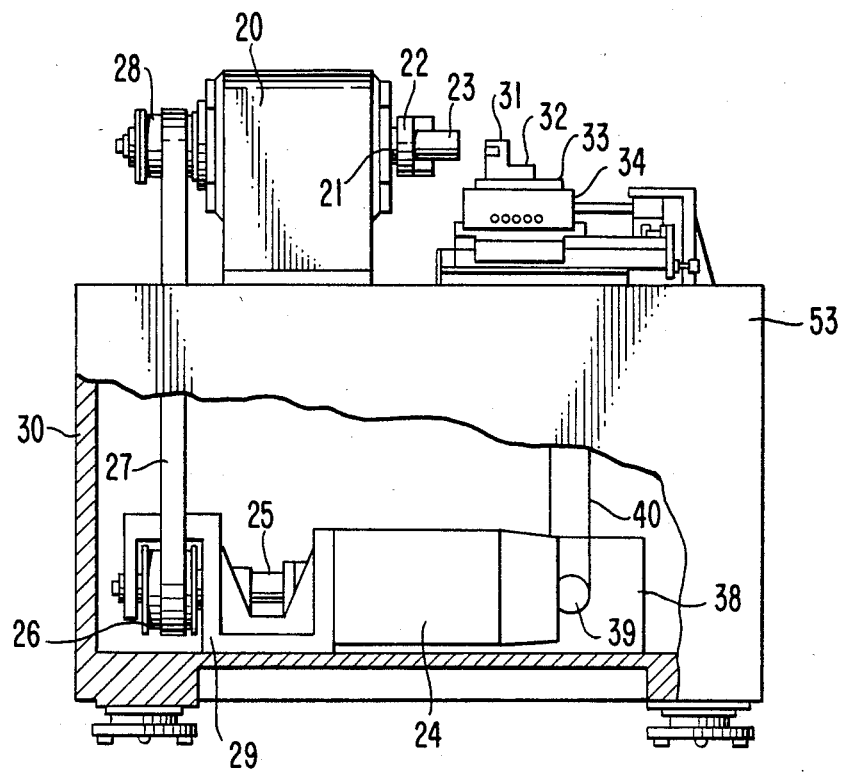
FIG. 3 is a front view, partly in section, of said lathe.
Figure 4:
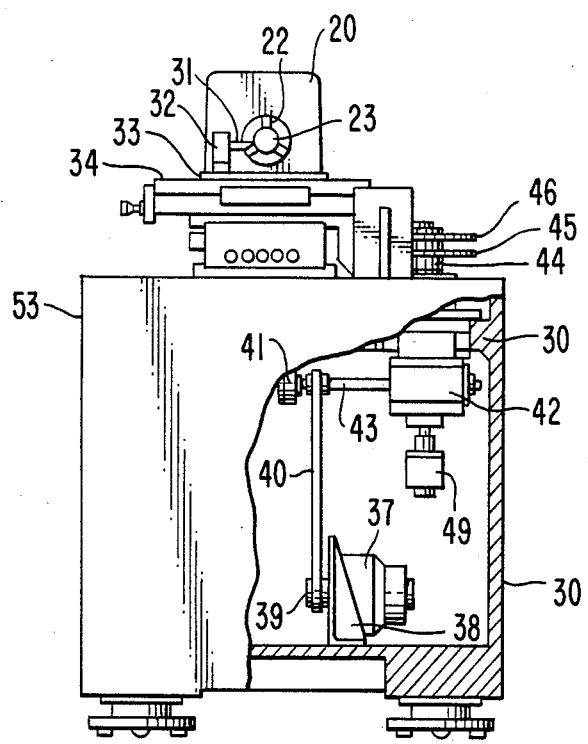
FIG. 4 is a side view, partly in section, of said lathe.

FIG. 2 is a plan view of a lathe using a spindle device according to an embodiment of the invention, also showing the layout of a hydraulic unit and control device, which are appurtenant devices. FIGS. 3 and 4 are a front view and a side view of the lathe, respectively.

In FIGS. 2-4, the spindle 21 of a headstock 20 has a chuck 22 attached thereto, and a workpiece 23 is gripped by the chuck 22. The spindle 21 is rotated by a pulley 28 receiving through a flat belt 27 the rotation of a belt pulley 26 connected to a spindle motor 24 by a coupling 25. The spindle motor 24 is fixed to a frame 30 by a bracket 29.

A cutter 31 is attached to a slide table section 34 through a cutter holder 32 and a cutter rest 33. The slide table section 34 comprises an X slide table 35 and a Y slide table 36.

A cam shaft motor 37 is attached to the frame 30 through a bracket 38, and the output of the cam shaft motor 37 is transmitted to the input shaft 43 of a speed reducer 42 through a pulley 39, timing belt 40 and pulley 41. Rotation of the input shaft 43 of the speed reducer 42 causes rotation of a cam shaft 44, which is the output shaft, thus rotating an X cam 45 and Y cam 46 attached to the cam shaft 44, and driving the X and Y slide tables 35 and 36 through levers 47 and 48. The cam shaft 44 has an encoder 49 connected thereto, so that a pulse signal detecting the rotative position of the cam shaft is fed to a control device 50.

In FIG. 2, a hydraulic unit 51, which is a hydraulic pressure generating device, serves to feed working fluid to a hydrostatic fluid bearing section for the headstock 20 and slide table section 34, while the control device 50 controls the hydraulic unit 51 and lathe main body 53 on the basis of signals from the encoder 49.

The arrangement of the lathe using a spindle device provided by the present invention has been outlined so far; now, parts will be described in detail.

Figure 5:
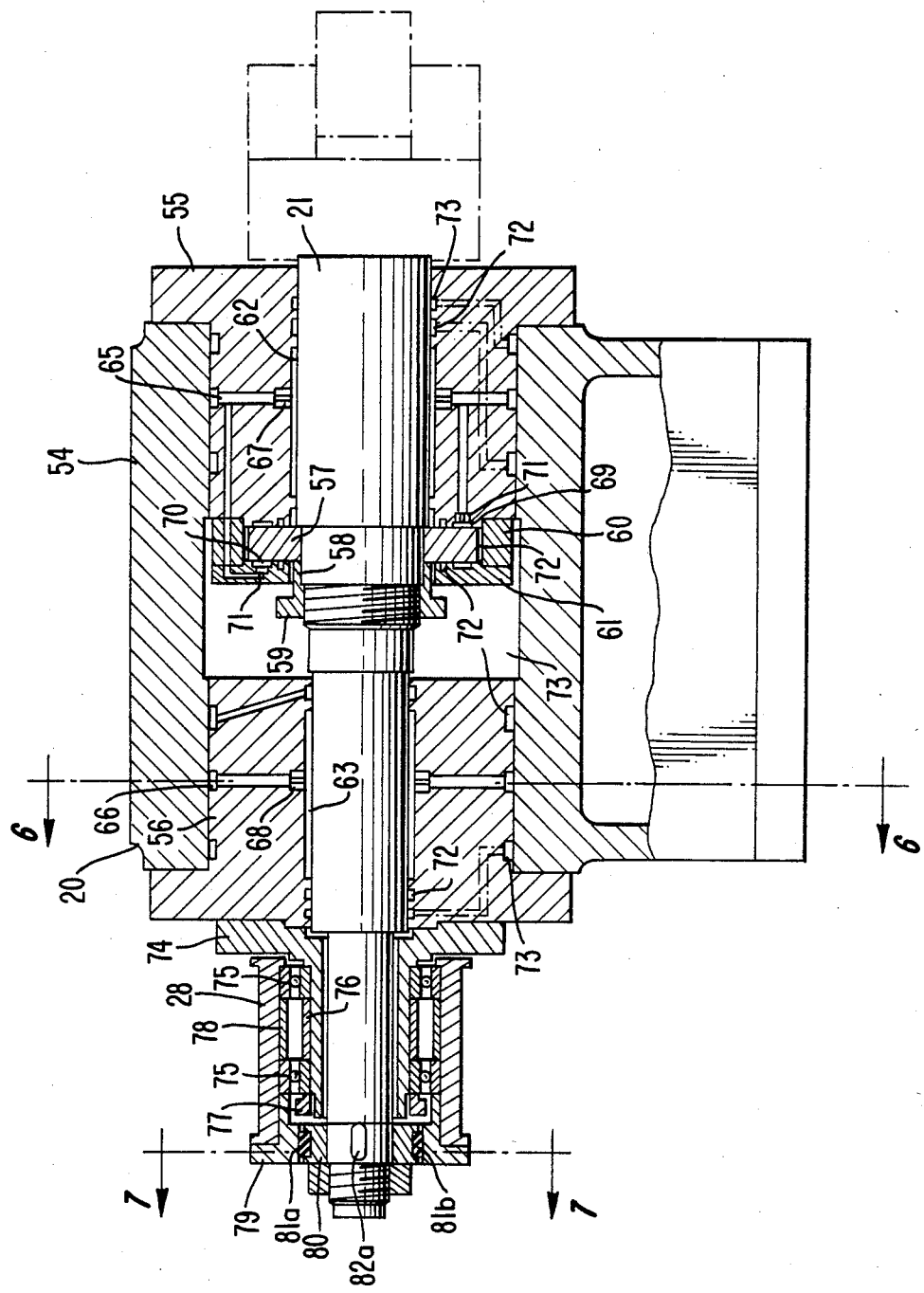
FIG. 5 is a longitudinal view, in section, of the headstock of said lathe.
Figure 6:
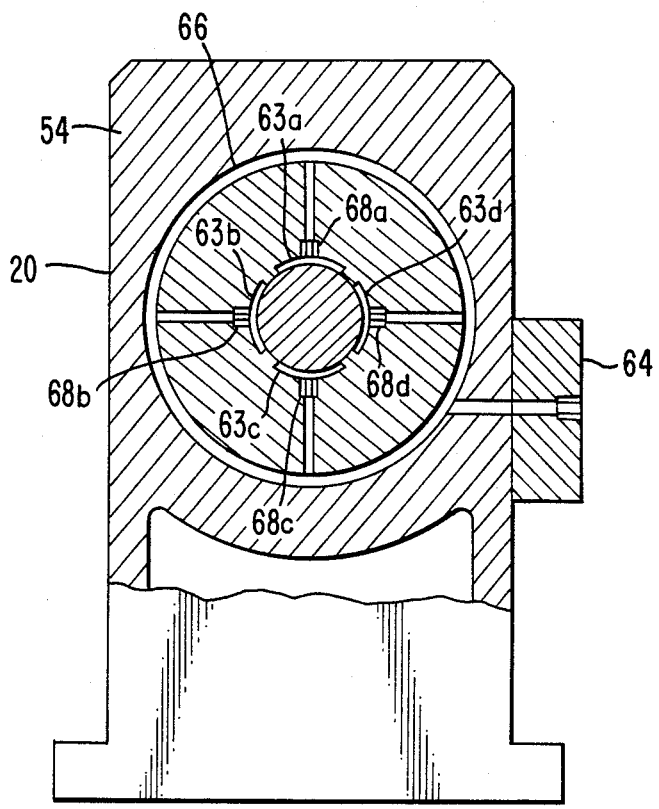
FIG. 6 is a sectional view taken along the line 6—6 of FIG. 5.

In FIGS. 5 and 6, the spindle 21 is fitted in a radial thrust bushing 55 and radial bushing 56 with a clearance of about 10 μm, and the bushings 55 and 56 are press-fitted in a housing 54 which rotatably supports the spindle 21. A flange 57 for supporting thrust loads is fixed to the spindle 21 by a nut 59 through a collar 58. The radial thrust bushing 55 has a thrust bushing 61 attached thereto through a spacer 60 at a position to hold the flange 57. In this connection, the clearances between the flange 57 and the thrust bushing 61 and between the flange 57 and the radial thrust bushing 55 are about 10 μm.

The inner surface of the radial thrust bushing 55 fitting on the spindle 21 is provided with pockets 62 at four places spaced in the circumferential direction, and the inner surface of the radial bushing 56 fitting on the spindle 21 is also provided with pockets 63a, 63b, 63c and 63d at four places spaced in the circumferential direction. The pockets 62, 63a-63d are fed with hydraulic pressure from an outside hydraulic unit 51 (FIG. 2) through a manifold 64, first oil passages 65 and 66 and chokes 67, 68a, 68b, 68c, and 68d.

The surfaces of the radial thrust bushing 55 and thrust bushing 61 opposed to the flange 57 are provided with pockets 69 and 70, which are fed with hydraulic pressure from the first oil passage 65 through a choke 71, in the same manner as pockets 62.

The working fluid flowing out of the pockets 62, 63a-63d, 69, 70 through the clearance between the spindle 21, radial bushing 56 and radial thrust bushing 55 or the clearances between the flange 57, radial thrust bushing 55 and thrust bushing 61 is recovered by the hydraulic unit 51 through a second oil passage 72. In FIG. 5, part of the second oil passage 72 is omitted. In FIG. 5, the working fluid flowing out of the second oil passage 72 passes through a third oil passage 73 (drain) and is recovered by the hydraulic unit 51.

As described above, the spindle 21 is supported by the radial thrust bushing 55, radial bushing 56 and thrust bushing 61 in a hydrostatic fluid bearing construction.

Figure 7:
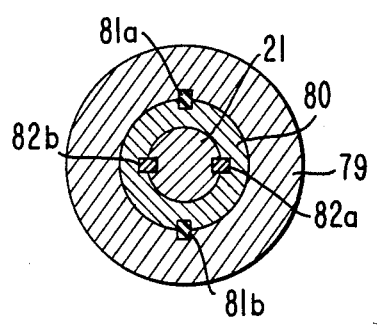
FIG. 7 is a sectional view taken along the line 7—7 of FIG. 5.

A bracket 74 is fixed to the radial bushing 56, and bearings 75 are attached to said bracket 74 by a collar 76 and nut 77. The pulley 28 is rotatably mounted on the bearings on the bracket 74 by a collar 78 and a keep plate 79. A transmission ring 80 is positioned between the keep plate 79 and the spindle 21, and the keep plate 79 and transmission ring 80 are connected together by elastic keys 81a and 81b, as shown in FIG. 7. Further, the transmission ring 80 and the spindle 21 are connected together by keys 82a and 82b.

In the arrangement described above, when torque is transmitted to the pulley 28 by the flat belt 27 (FIG. 3), it is transmitted to the spindle 21 by means of the keys 81a and 81b, transmission ring 80 and keys 82a and 82b. Since the spindle 21 is supported by the hydrostatic bearing structure and since the keys 81a and 81b are made of elastic material, the spindle is rotated with little swing of the axis.

While the keys 81a, 81b, 82a and 82b may all be made of elastic material, if the keys 82a and 82b, which are located at a position of small rotation radius and which are subjected to higher shearing force, are made of substantially rigid material, such as steel, and if the keys 81a and 81b, which are located at a position of large rotation radius and which are subjected to lower shearing force, are made of elastic material, such as urethane rubber, then the spindle swing is reduced and the life of the keys is prolonged.

In addition, if the keys 81a, 81b, 82a and 82b are symmetrically arranged with respect to the axis of the spindle 21, this is more effective as there is no radial load produced on the spindle 21. The merit is greater if the keys 81a and 81b and the keys 82a and 82b are arranged at right angles to each other.

Figure 8:
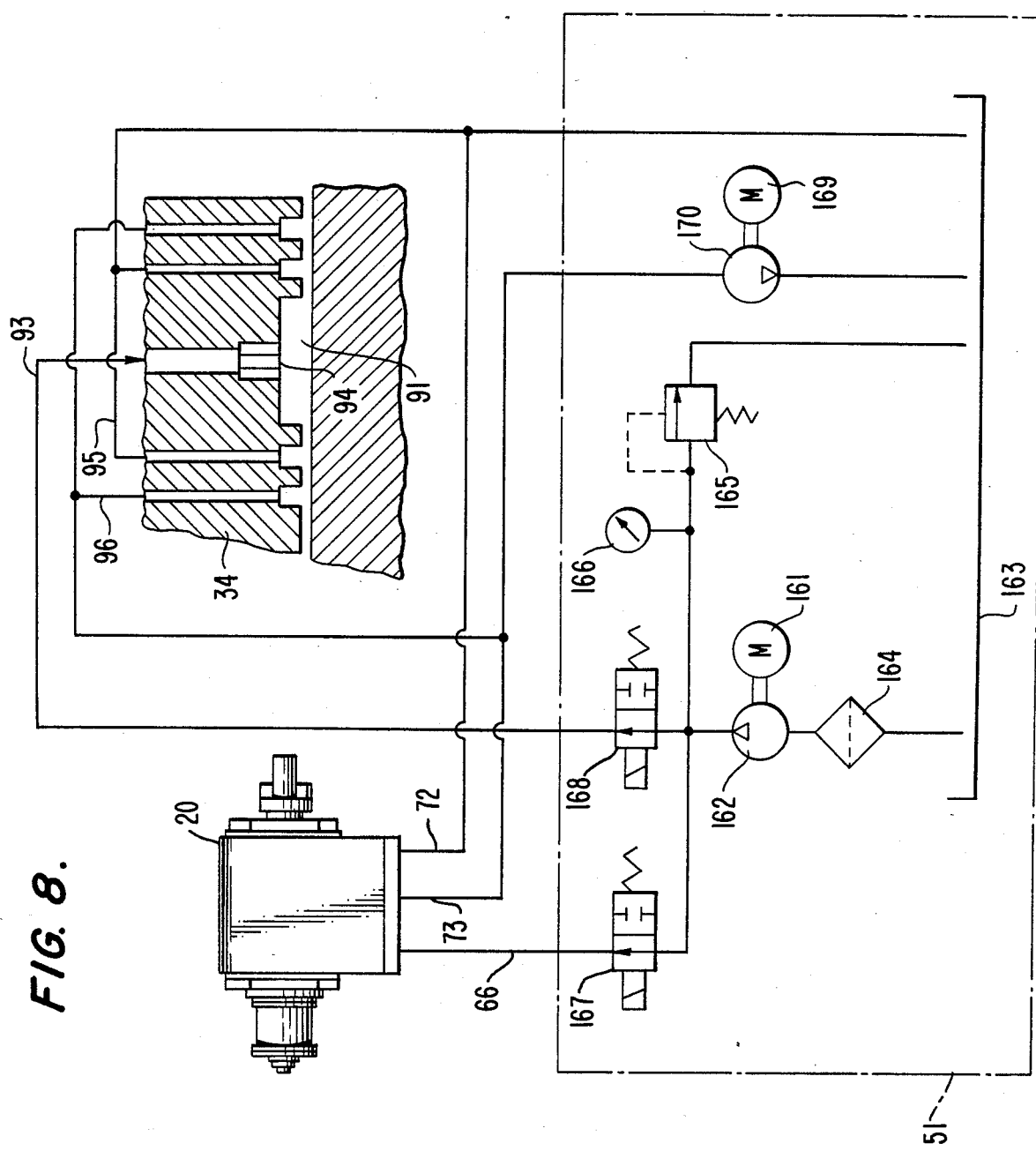
FIG. 8 is a hydraulic circuit diagram of the lathe of said embodiment.

The hydraulic circuit of the hydraulic unit 51 for feeding working fluid to the hydrostatic fluid bearing structure for the headstock 20 and slide section 34 will now be described with reference to FIG. 8.

Working fluid drawn up from a tank 163 by a pump 162 driven by a motor 161 is passed through a filter 164 and pressurized by the pump 162. A relief valve 165 serves to maintain the pressure at a constant value, and the pressure is indicated by a meter 166. The working fluid coming out of the pump 162 is passed through a switching valves 167 and 168, part of the working fluid being fed to the headstock 20 and another part to the slide table section 34.

The working fluid coming out of the switching valve 167 is passed through the chokes 67, 68 and 71 shown in FIG. 5 and is fed to the pockets 62, 63a-63d, 69 and 70. The working fluid flowing out of the pockets 62, 63a-63d, 69 and 70 through the clearances defined by the spindle 21 and the flange 57 and the radial thrust bushing 55, the radial bushing 56 and the thrust bushing 61 is passed through the second oil passage 72 and recovered by the tank 163. The working fluid flowing out of the second oil passage 72 is passed through the third oil passage 73 and recovered by the tank 163.

On the other hand, the working fluid coming out of the switching valve 168 is passed through the first oil passage 93 and choke 94 and fed to the pocket 91. The working fluid flowing out of the pocket 91 is mostly recovered by the second oil passage 95. The working fluid flowing out of the second oil passage 95 is recovered by the third oil passage 96. A pump 170 driven by a motor 169 is connected to the third oil passage 96, so that the working fluid in the third oil passage 96 is forcibly drawn in by the pump 170 and recovered by the tank 163.

INDUSTRIAL APPLICABILITY

The invention has the following merits. The spindle of the headstock is supported by the hydrostatic fluid bearing, while the torque transmitted by the belt is only supported by the pulley. Therefore, the radial load imposed on the pulley by the belt tension is supported by the bracket through the bearing. The torque transmitted to the pulley is transmitted to the spindle by the transmission ring and keys. As a result, the radial load due to the belt tension is not imposed on the spindle, so that the characteristic of the hydrostatic fluid bearing structure is fully developed to allow the spindle to rotate with high accuracy without causing much spindle swing.

In such an arrangement, if the keys are made of substantially rigid material, a radial load could be produced on the spindle owing to errors in indexing the key ways provided in the pulley, transmission ring and spindle, thus causing spindle swing. However, in the spindle device of the present invention, errors in indexing the key ways are compensated for by using an elastic material for the keys, so that the spindle rotates accurately. For this reason, a lathe using the present spindle device is capable of high precision machining and is effective in machining soft materials in particular, such as aluminum and brass.

What is claimed is:
1. A spindle device comprising:
a housing;
a hydrostatic fluid bearing in said housing;
a spindle rotatably supported in said hydrostatic fluid bearing;
a bracket securely mounted on said housing;
a roller bearing on the outer circumference of said bracket concentric with said spindle;
a pulley mounted on said roller bearing; and
a connecting means connecting said pulley with said spindle, said connecting means being constituted by a transmission ring between said pulley and said spindle, at least one first key made of an elastic material and coupling said pulley with said transmission ring, and at least one second key made of a rigid material coupling said transmission ring with said spindle, whereby the rotation of said pulley is transmitted to said spindle through said first key, said transmission ring and said second key.

2. A spindle device as claimed in claim 1 wherein there are two first and two second keys, the respective keys being at positions symmetrical with respect to the axis of said spindle.

3. A spindle device as claimed in claim 2 wherein said first and second keys are located approximately 90° apart from each other around the axis of said spindle.

* * * * *